Figure 1:
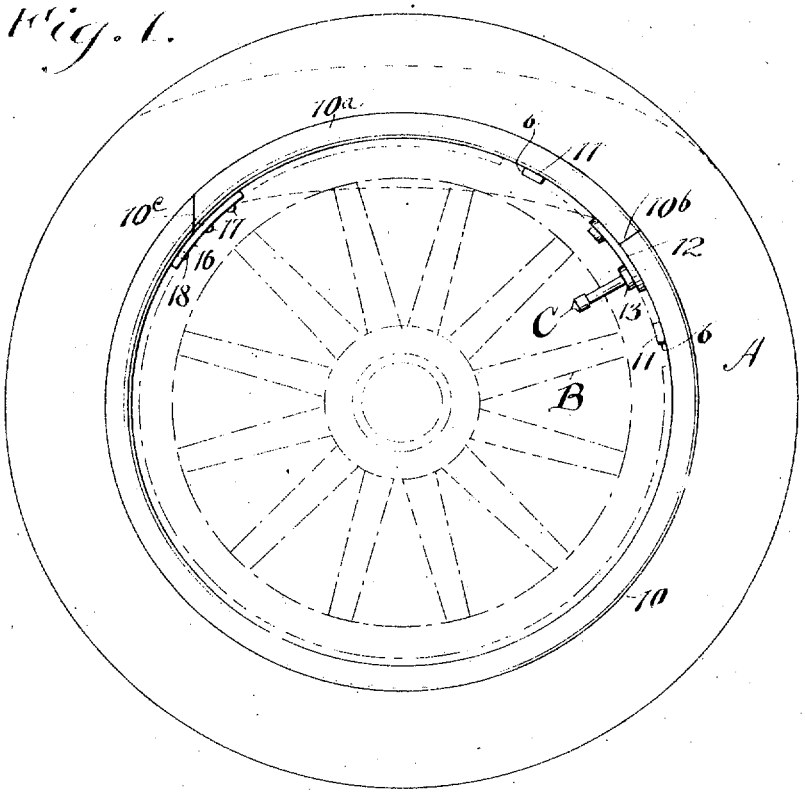

C. D. PAXSON.

DETACHABLE WHEEL RIM.

APPLICATION FILED JAN. 12, 1918.

Reissued Apr. 15, 1919.

14,634

Inventor.
C. D. Paxson
By Thurston & Kerr
attys

UNITED STATES PATENT OFFICE.

CALVIN D. PAXSON, OF CLEVELAND, OHIO, ASSIGNOR TO THE PAXSON RIM CO., OF CLEVELAND, OHIO, A CORPORATION OF OHIO.

DETACHABLE WHEEL-RIM.

14,634. Specification of Reissued Letters Patent. Reissued Apr. 15, 1919.

Original No. 1,223,900, dated April 24, 1917, Serial No. 123,468, filed October 3, 1916. Application for reissue filed January 12, 1918. Serial No. 211,628.

*To all whom it may concern:*

Be it known that I, CALVIN D. PAXSON, a citizen of the United States, and a resident of Cleveland, in the county of Cuyahoga and State of Ohio, have invented a new and Improved Detachable Wheel-Rim, of which the following is a full, clear, and exact description.

My invention relates to detachable rims for automobile wheels and more particularly to the type in which the detachable rim is formed in sections so that one section may be moved to permit the tire to collapse for facilitating its removal.

An object of the invention is to provide a detachable rim of the type referred to, in which one section of the rim may be completely removed from the other to permit the tire to freely sag at the portion of the rim from which the section has been removed, thereby causing the tire to more effectively loosen on the remainder of the rim.

A further object of the invention is to provide means on the rim to securely lock the removable section in proper position, and so formed and arranged as to facilitate the unlocking and removal of the said section.

The invention will be particularly explained in the specific description following.

Reference is to be had to the accompanying drawings forming a part of this specification in which similar reference characters indicate corresponding parts in all the views.

Figure 2:
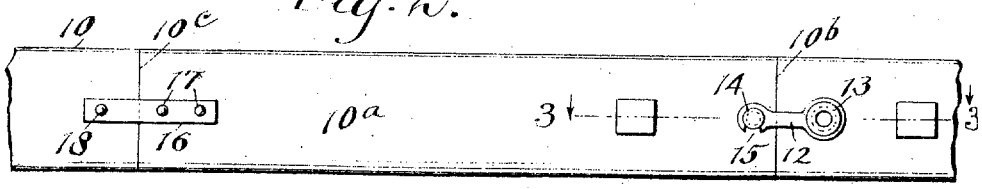
Figure 3:
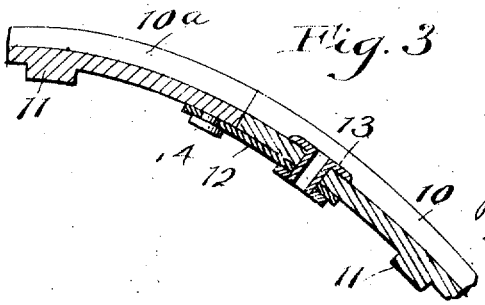

Figure 1 is a side elevation of a detachable rim embodying my invention, showing the same in use; Fig. 2 is a fragmentary interior view; Fig. 3 is a section on the line 3—3 Fig. 2.

In forming a wheel rim 10 in accordance with my invention, the same is provided with a section $10^a$ separate from the remainder of the rim. The exterior formation of the rim 10 may be suitable for any type of tire A, and the inner formation will be such as to co-act with any of the usual peripheral formations of the felly of the wheel B. The body 10 of the rim and the removable section $10^a$ may have protuberances 11 at the inner side and the felly of the wheel B will have any suitable formation presenting shoulders as at *b* to co-act with said protuberances and prevent creeping of the rim.

The joints between the removable section $10^a$ and the body 10 of the detachable rim may be of any suitable form. I have shown at one end of the section $10^a$ a radial butt-joint $10^b$ and at the opposite end a beveled joint $10^c$.

At one end of the section $10^a$ the securing and locking means therefor includes a swinging latch 12. The latch 12 is pivoted at one end on the body 10 of the rim adjacent to the removable section $10^a$. Advantageously, the pivot consists of a tubular stud or rivet 13 through which the stem C of the valve may project. At its free end, the latch 12 is adapted to effect hooked engagement with a headed pin 14 projecting radially inward from the inner surface of the removable section $10^a$, the said free end having a lateral slot 15 giving the latch a hooked formation to pass beneath the head of the pin 14.

At the opposite end of the section $10^a$, there is secured to the same a cleat 16 which projects beyond the end of the section $10^a$ to overlap the body 10 of the rim. On the adjacent end of the body 10 there is a stud 18 projecting radially inward and the overlapped end of the cleat 16 is formed with a pin hole to receive said pin 18.

By the described arrangement, when the rim with a tire thereon has been detached from the wheel, the latch 12 will be swung laterally to disengage the same from the headed pin 14, then the cleat 16, which usually will be of resilient metal, is disengaged from the pin 18 so that the section $10^a$ may be completely removed instead of merely being swung out of its normal position. The tire may now sag between the ends of the body 10 of the rim as indicated in dotted lines, Fig. 1, thereby loosening the tire on the body of the rim and permitting the tire to be readily removed.

For the attainment of the best results in ease and quickness of applying and removing a tire from the rim, two features are essential, to wit: It is necessary that the removable section be of substantial length, preferably substantially the length shown in the drawings, and that the opening for the valve stem be near one end of the main section.

With the proportions and arrangements substantially as shown in the drawings, the removable section can be readily removed from the main section of the rim, and the space created by removing the removable section is of sufficient extent to permit the tire to be sagged or forced into the space, thus loosening it from the main section. At the same time, with the opening for the tire valve located near one end of the main section, the tire can be quickly removed from the main portion after being loosened in the manner above stated, by swinging the middle portion of the main section out from the plane of the tire, and can easily be restored thereon by first placing in position the end provided with the opening for the valve stem and then progressively seating the remaining portion, after which the removable section can be snapped into place.

Having thus described my invention, I claim as new, and desire to secure by Letters Patent:

1. A detachable rim composed of a main body section constituting the major portion of the rim, a section constituting the remaining portion of the rim and bodily removable from the main section, and means to detachably fasten both ends of the removable section, the fastening means at one end consisting of a stud projecting radially inward on the removable section, a tubular rivet on the adjacent end of the body section of the rim, and a latch pivotally secured at one end by the said tubular rivet, the said tubular rivet forming a passage for the air valve, the opposite end of the latch having a hooked formation to engage the said pin on the removable section.

2. A detachable rim for wheels composed of a main section constituting the major portion of the rim, and a minor section of substantial length bodily removable from the main section, one of said sections having nearer one end than the center thereof an opening for the valve stem of a tire to be seated on the rim.

3. A detachable rim for wheels composed of a main section and a section bodily removable from the main section, means by which the removable section may be fastened to the main section so as to make a complete rigid rim, the main section having near one end thereof an opening for the valve stem of a tire to be seated on the rim.

4. A detachable rim for wheels composed of a main section greater than 180° of arcuate length, and a minor section greater than 90° of arcuate length bodily removable from the main section, one of said sections having nearer one end than the center thereof an opening for the valve stem of a tire to be seated on the rim.

5. A detachable rim for wheels composed of a main section greater than 180° of arcuate length, a removable section greater than 90° of arcuate length bodily removable from the main section, means for detachably securing the removable section to the main section so as to form a substantially continuous, rigid rim, said main section having near one end thereof an opening for the valve stem of a tire to be seated on the rim.

6. A detachable rim for wheels composed of a main section constituting the major portion of the rim and a minor section of substantial length bodily removable from the main section, and a fastening member carried by one end of one section and adapted to overlap the adjoining end of the other section, said fastening member and the end portion of the section carrying said member having an opening for a valve stem.

In testimony whereof, I hereunto affix my signature.

CALVIN D. PAXSON.